United States Patent
Tanaka et al.

(10) Patent No.: US 6,426,316 B2
(45) Date of Patent: Jul. 30, 2002

(54) EXHAUST EMISSION CONTROL CATALYST FOR DIESEL ENGINES

(75) Inventors: Toshiaki Tanaka, Numazu; Yoshio Fujimoto, Shizuoka; Nobumoto Ohashi; Shinichi Takeshima, both of Susono; Kazuhiro Ito, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/242,496

(22) PCT Filed: Aug. 13, 1997

(86) PCT No.: PCT/JP97/02826

§ 371 (c)(1),
(2), (4) Date: Feb. 12, 1999

(87) PCT Pub. No.: WO98/06492

PCT Pub. Date: Feb. 19, 1998

(30) Foreign Application Priority Data

Aug. 13, 1996 (JP) .............................................. 8-213853

(51) Int. Cl.⁷ ........................... B01J 23/02; B01J 23/04; B01J 35/00
(52) U.S. Cl. ................... 502/340; 502/344; 502/527.13
(58) Field of Search ................................ 502/326, 327, 502/350, 66, 64, 527.12, 527.13, 527.14, 527.15, 527.16, 527.17, 340, 344, 339

(56) References Cited

U.S. PATENT DOCUMENTS

| | | | | |
|---|---|---|---|---|
| 3,873,469 A | * | 3/1975 | Foster et al. ................. | 252/455 |
| 4,171,288 A | * | 10/1979 | Keith et al. ................. | 252/462 |
| 4,378,308 A | | 3/1983 | Angevine et al. ........... | 252/455 |
| 4,650,782 A | | 3/1987 | Onal .......................... | 502/339 |
| 4,702,897 A | * | 10/1987 | Onal ....................... | 423/213.5 |
| 4,835,131 A | | 5/1989 | DeJong ...................... | 502/255 |
| 4,923,842 A | | 5/1990 | Summers .................... | 502/261 |
| 5,292,991 A | * | 3/1994 | Lachman et al. ........... | 585/850 |
| 5,330,945 A | * | 7/1994 | Beckmeyer et al. .......... | 502/66 |
| 5,354,720 A | | 10/1994 | Leyrer et al. | |
| 5,538,697 A | * | 7/1996 | Abe et al. .................... | 422/171 |
| 5,591,414 A | * | 1/1997 | Jacob et al. ................. | 422/180 |
| 5,597,771 A | * | 1/1997 | Hu et al. | |
| 5,710,084 A | * | 1/1998 | Nojima et al. ................. | 502/66 |
| 5,958,828 A | * | 9/1999 | Murakami et al. .......... | 502/333 |

FOREIGN PATENT DOCUMENTS

| | | |
|---|---|---|
| EP | 0 439 010 | 7/1991 |
| JP | 59-134311 | 8/1984 |
| JP | 60-32927 | 2/1985 |
| JP | 62-1737 | 1/1987 |
| JP | 63-256142 | 10/1988 |
| JP | 5-57191 | 3/1993 |
| JP | 6-71179 | 3/1994 |
| JP | 6-198181 | 7/1994 |
| JP | 9-38501 | 2/1997 |
| JP | 9-57066 | 3/1997 |
| JP | 9-103679 | 4/1997 |
| JP | 9-141106 | 6/1997 |
| JP | 9-267039 | 10/1997 |

OTHER PUBLICATIONS

Patent Abstracts of Japan, vol. 5, No. 028, Feb. 20, 1981 & JP 55 152551 A (Mazda Motor Corp), Nov. 27, 1980.
Database WPI, Section Ch. Week 197747, Derwent Publications Ltd., London, GB; Class E36, AN 1977-83851Y XP002183758 & JP 52 122290 A (TDK Electronics Co Ltd), Oct. 14, 1977.

* cited by examiner

Primary Examiner—Steven P. Griffin
Assistant Examiner—Christina Ildebrando
(74) Attorney, Agent, or Firm—Kenyon & Kenyon (57) ABSTRACT

An exhaust purification catalyst for a compression ignition engine comprises a carrier substrate and a metal-carrying layer which carries catalytic metal formed on the surface of the carrier substrate, and is characterized in that a diffusion restriction layer having a thickness smaller than 170 μm is provided on the surface of the metal-carrying layer opposite to the

5 Claims, 5 Drawing Sheets

| THICKNESS OF DIFFUSION RESTRICTION LAYER (μm) | 0 | 50 | 100 | 200 |
|---|---|---|---|---|
| AMOUNT OF PRODUCTED SULFIDE (mg/m³) | 20 | 6 | 6 | 2 |
| PURIFICATION PERCENTAGE OF HC (%) | 67 | 41 | 29 | 10 |
| PURIFICATION PERCENTAGE OF SOF (%) | 36 | 30 | 41 | 17 |

EXHAUST EMISSION CONTROL CATALYST FOR DIESEL ENGINES

TECHNICAL FIELD

The invention is related to an exhaust purification catalyst for a compression ignition engine.

BACKGROUND ART

An exhaust purification catalyst is known for purifying HC, CO and SOF included in an exhaust gas discharged from a compression ignition:)engine (Japanese Unexamined Patent Publication No. 5-57191). The exhaust purification catalyst comprises a carrier substrate, and, an activated alumina layer carries catalytic metal, for purifying HC, CO and SOF, on a surface of the carrier substrate. Further, $SO_2$ is included in the exhaust gas, and toxic $SO_3$ is produced when $SO_2$ reaches the catalytic metal and is oxidized. Thus, according to the above exhaust purification catalyst, in order to prevent $SO_2$ from reaching the catalytic metal, a trap layer for trapping $SO_2$ is provided upstream of the activated alumina layer. The trap layer is made of an alumina layer including, for example, Mn oxide therein.

In the above exhaust purification catalyst, the amount of $SO_2$ trapped by the trap layer is limited. Further, there is a possibility that the trap layer may become unable to trap $SO_2$ due to the deterioration thereof. Therefore, there is a problem that it easily becomes impossible to prevent $SO_2$ from reaching the catalytic metal. Thus, the object of the invention is to prevent $SO_2$ from reaching the metal-carrying layer.

DISCLOSURE OF INVENTION

In the first invention, an exhaust purification catalyst for a compression ignition engine comprises a carrier substrate and a metal-carrying layer which carries catalytic metal formed on the surface of the carrier substrate and is characterized in that a diffusion restriction layer having a thickness less than 170 $\mu$m is provided on the surface of the metal-carrying layer opposite to the carrier substrates. The diffusion restriction layer provided on the surface of the metal-carrying layer prevents substances included in the exhaust gas from diffusing into the metal-carrying layer.

In the second invention, an exhaust purification catalyst for a-compression ignition engine comprises a carrier substrate and a porous metal-carrying layer which carries catalytic metal formed on the surface of the carrier substrate and is characterized:in that a porous diffusion restriction layer which includes pores having sizes smaller than those of the metal-carrying layer is provided on the surface of the metal-carrying layer opposite to the carrier substrate. The diffusion restriction layer which has pores having sizes smaller than those of the metal-carrying layer prevents substances included in the exhaust gas from diffusing into the metal-carrying layer.

In the third invention according to the first or second invention, catalytic metal which has an oxidation power lower than that of the catalytic metal carried on the metal-carrying layer is carried on the diffusion restriction layer. Therefore, the substances included in the exhaust gas are oxidized in the diffusion restriction layer.

In the fourth invention according to the first or second invention, a catalytic metal which traps $SO_2$ is carried on the diffusion restriction layer. $SO_2$ included in the exhaust gas is trapped by the diffusion restriction layer so that $SO_2$ is further restricted from diffusing into the metal-carrying layer.

In the fifth invention according to the first or second invention, a diffusion restriction layer is provided between the carrier substrate and the metal-carrying layer. Therefore, the chance that substances included in the exhaust gas stay in the vicinity of the metal-carrying layer is increased.

In the sixth invention according to the first or second invention, an adsorbing layer is provided for adsorbing hydrocarbon between the carrier substrate and the metal-carrying layer. Therefore, the chance that HC included in the exhaust gas stays in the vicinity of the metal-carrying layer is increased.

In the seventh invention according to the first or second invention, a portion having a predetermined thickness of the diffusion restriction layer which extends from the surface of the diffusion restriction layer opposite to the metal-carrying layer into the diffusion restriction layer comprises a thermal deterioration restriction layer which has thermal resistance.

In the eighth invention according to the seventh invention, the thermal deterioration restriction layer is made of alumina, and the remaining diffusion restriction layer is made of titania.

BEST MODE FOR CARRYING OUT THE INVENTION

Figure 1:
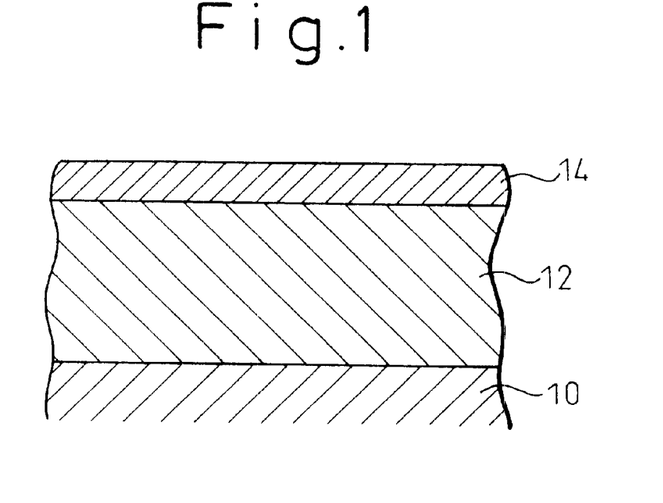
FIG. 1 is a cross-sectional view of the first embodiment of the exhaust purification catalyst.

Embodiments according to the invention will be explained below, referring to the drawings. FIG. 1 is a partial cross sectional view of the first embodiment of the exhaust purification catalyst.

In FIG. 1, 10 denotes a carrier substrate for carrying layers which purify an exhaust gas. The substrate 10 is a monolith type such as a foam filter or a honeycomb filter, or a pellet type. The material of the substrate 10 is a ceramic such as cordierite or a metal.

A metal-carrying layer 12 which carries catalytic metal for oxidizing HC (hydrocarbon), CO (carbon monoxide) and SOF (soluble organic substance) included in the exhaust gas is provided on the surface of the carrier substrate 10. The metal-carrying layer 12 is porous. The material of the metal-carrying layer 12 is selected from, for example, alumina, titania, silica and zirconia. On the other hand, the catalytic metal carried on the metal-carrying layer 12 is selected from, for example, Pt, Rh and Pd.

A diffusion restriction layer 14 which prevents $SO_2$ (sulfur dioxide) included in the exhaust gas from reaching the metal-carrying layer 12 is provided on the surface of the metal-carrying layer 12 opposite to the carrier substrate 10.

The diffusion restriction layer 14 is porous. The material of the diffusion restriction layer 14 is selected from, for example, alumina, titania and silica.

Figure 2:
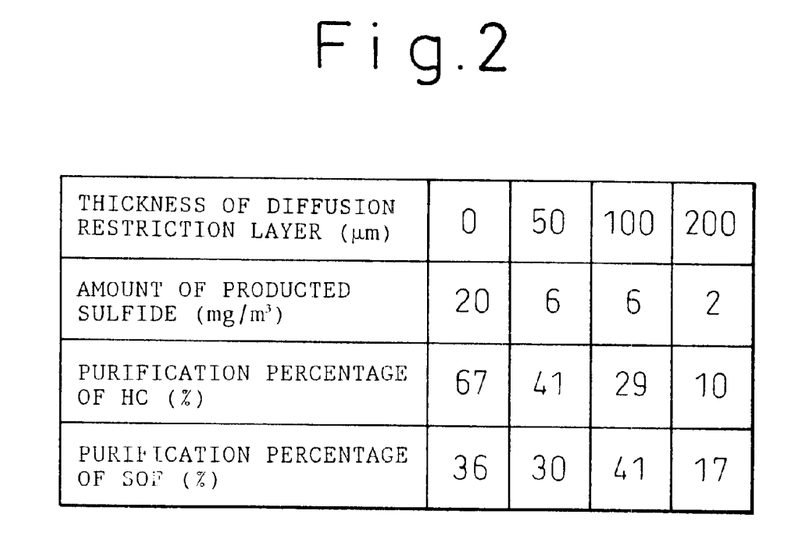
FIG. 2 is a view showing the amount of the produced sulfide and the percentages of the purification of HC and SOF in the different thicknesses of the diffusion restriction layer.

FIG. 2 shows the amount of the produced sulfide and the percentages of the purification of HC and SOF without any diffusion restriction layer and with diffusion restriction layers which have different thicknesses at the catalyst temperature of 550° C.

Figure 3:
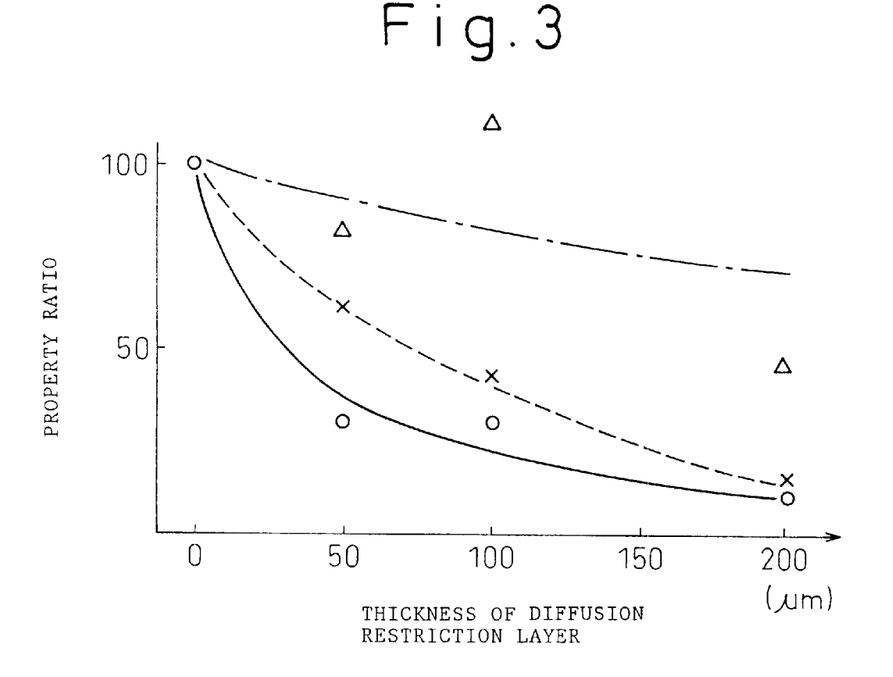
FIG. 3 is a view showing a relationship between the thickness of the diffusion restriction layer and the property ratio.

FIG. 3 shows a relationship between the thickness of the diffusion restriction layer 14 and the property ratios calculated on the basis of FIG. 2. In FIG. 3, the property includes the amount of the produced sulfide, and the percentages of the purification of HC SOF, the property ratios includes ratios of the property in the catalyst provided with diffusion restriction layers which have different thicknesses to the property in the catalyst provided with no diffusion restriction layer. That is, in FIG. 3, the solid line illustrates the ratio of the amount of the produced sulfide in case that the diffusion restriction layer 14 is provided to that in case that no diffusion restriction layer is provided, the dotted line illustrates the ratio of the purification percentage of HC in case of the diffusion restriction layer 14 is provided to that in case that no diffusion restriction layer is provided, and the dotted line including some points illustrates the ratio of the purification percentage of SOF in case that the diffusion restriction layer 14 is provided to that in case that no diffusion restriction layer is provided.

Referring to FIG. 3, each property ratio is decreased when the thickness of the diffusion restriction layer 14 is decreased. However, the degree of the decrease in the property ratio is different for every property ratio. That is, the degree of the decrease in the property ratio related to the amount of the produced sulfide is greater than those related to other property ratios. Therefore, in the exhaust purification catalyst according to the first embodiment, the amount of the produced sulfide is decreased while a decrease in the efficiency of purification of HC and SOF is prevented.

Figure 4:
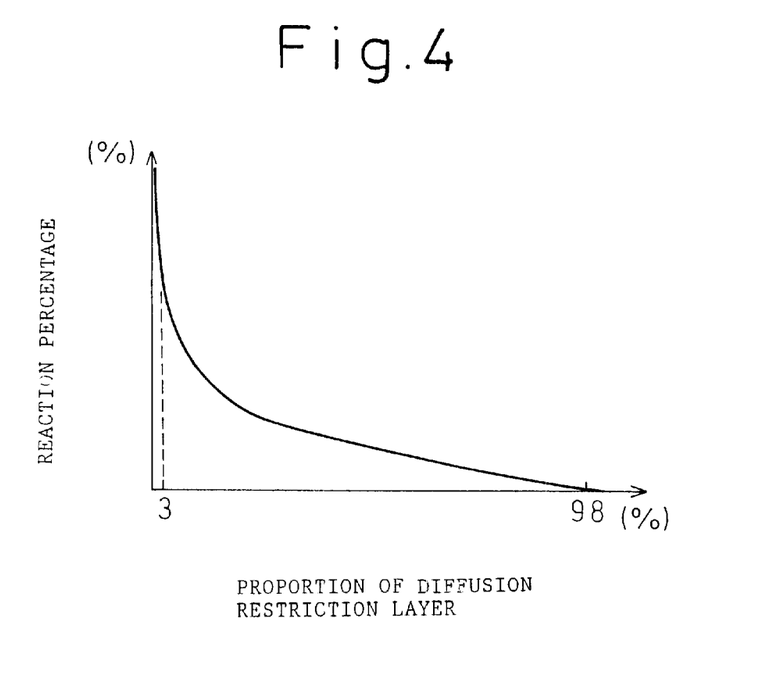
FIG. 4 is a view showing a relationship between the proportion of the thickness of the diffusion restriction layer and the percentage of the oxidation reaction.

FIG. 4 shows a relationship between the proportion of the thickness of the diffusion restriction layer and the efficiency of the oxidation reaction of $SO_2$. The proportion of the thickness of the diffusion restriction layer means the proportion of the thickness of the diffusion restriction layer 14 to that of the metal-carrying layer 12. Further, in FIG. 4, the proportion of the thickness of the diffusion restriction layer is a proportion relative to the about 170 μm thickness of the metal-carrying layer.

Referring to FIG. 4, the percentage of the oxidation reaction of $SO_2$ is decreased when the proportion of the thickness of the diffusion restriction layer is increased. Also, the percentages of the purification of HC, CO and SOF are decreased when the proportion of the thickness of the diffusion restriction layer is decreased. Further, the percentage of the oxidation reaction of $SO_2$ is about zero when the proportion of the thickness of the diffusion restriction layer exceeds 100%, i.e., about 170 μm. Therefore, preferably, in order to prevent the decrease of the purification percentages of HC, CO and SOF and to decrease the percentage of the oxidation reaction of $SO_2$, the thickness of the diffusion restriction layer is equal to or smaller than 170 μm and the proportion of the diffusion restriction layer is 3% to 98%.

Further, the rate of change of the decrease of the percentage of the oxidation reaction of $SO_2$ in the range of the proportion of the thickness between 3% and 20% is larger than that in the range of the other proportion of the thickness. Therefore, further preferably, in order to prevent the decrease in the purification percentages of HC, CO and SOF and to decrease the percentage of the oxidation reaction of $SO_2$, the proportion of the diffusion restriction layer is 3% to 20%.

Figure 5:
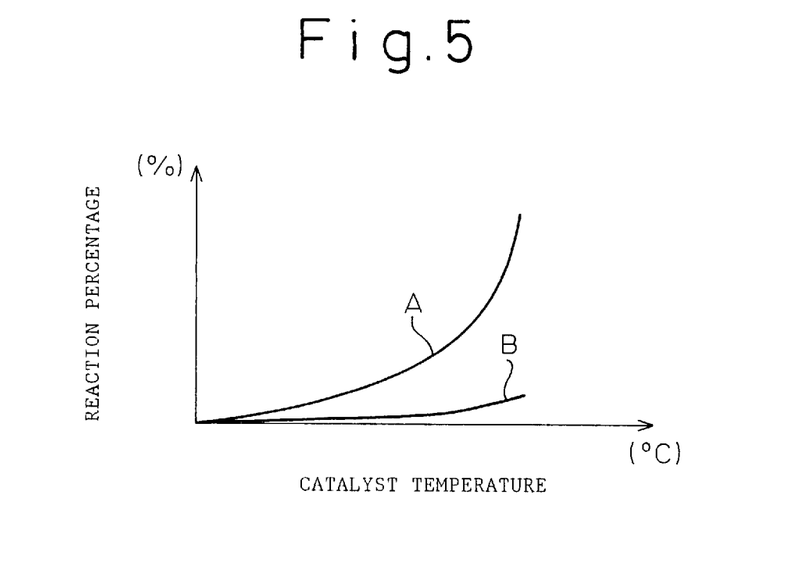
FIG. 5 is a view showing a relationship between the catalyst temperature and the rates of the oxidation reactions of HC, CO, SOF and $SO_2$.

The percentage of the oxidation re action is increased to produce a large amount of the toxic $SO_3$ when the catalyst temperature is increased. FIG. 5 shows a relationship between the catalyst temperature and the percentage of the oxidation reaction of $SO_2$. The curve A denotes the percentage of the oxidation reaction of $SO_2$ in case that no diffusion restriction layer is provided, and the curve B denotes the percentage of the oxidation reaction of $SO_2$ in case that the diffusion restriction layer is provided. Referring to FIG. 5, in the exhaust purification catalyst according to the first embodiment, $SO_2$ is prevented from reaching the metal-carrying layer so that the inclination of the increasing of that the percentage of the oxidation reaction of $SO_2$ when the catalyst temperature is increased is smaller than that in the exhaust purification catalyst provided with no diffusion restriction layer.

Figure 6:
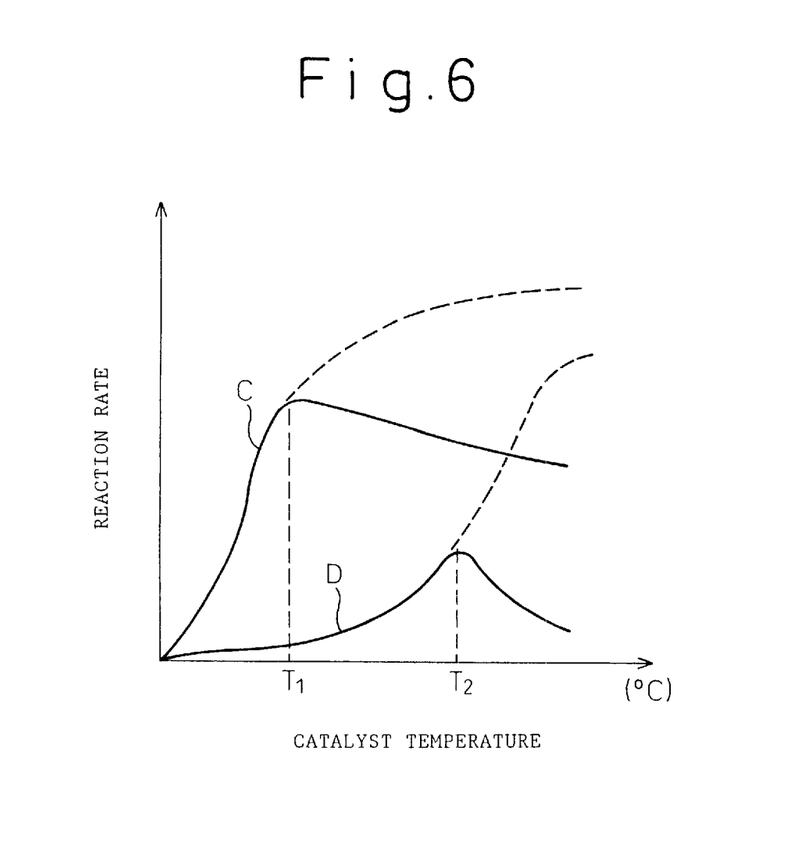
FIG. 6 is a view showing a relationship between the catalyst temperature and the percentage of the oxidation reaction of $SO_2$.

The effect of preventing each compound, i.e., HC, CO, SOF and $SO_2$ from reaching the metal-carrying layer is different for every compound. FIG. 6 shows a relationship between the catalyst temperature and the rates of the oxidation reaction of HC, CO, SOF and $SO_2$. The curve C denotes the rate of the oxidation reaction of HC, CO and SOF, and the curve D denotes the rate of the oxidation reaction of $SO_2$. Further, the dotted line denotes the rate of the oxidation reaction in case that no diffusion restriction layer is provided, and solid line denotes the rate of the oxidation reaction in case that the diffusion restriction layer is provided.

Referring to FIG. 6, the rate of the oxidation reaction of HC, CO and SOF in the catalyst provided with the diffusion restriction layer is smaller than that in the catalyst provided with no diffusion restriction layer when the catalyst-temperature exceeds a predetermined temperature $T_1$. Further, the percentage of the oxidation reaction of $SO_2$ in the catalyst provided with the diffusion restriction layer is smaller than that in the catalyst provided with no diffusion restriction layer when the catalyst temperature exceeds a predetermined temperature $T_2$.

Further, the percentage of the decrease of the rate of the oxidation reaction of HC, CO and SOF by the diffusion restriction layer is smaller than the percentage of the decrease of the rate of the oxidation reaction of $SO_2$ by the diffusion restriction layer. That is, the effect of the diffusion restriction layer to prevent $SO_2$ from diffusing is larger than that of the diffusion restriction layer to prevent HC, CO and SOF. This is caused since the characteristic of $SO_2$ to adsorb on the diffusion restriction layer is larger those of HC, CO and SOF, so that $SO_2$ rather than HC, CO and SOF cannot easily reach the metal-carrying layer.

Therefore, in the catalyst provided with the diffusion restriction layer, the rate of the oxidation reaction of $SO_2$ is kept relatively small and the rates of the oxidation reaction of HC, CO and SOF are kept relatively large when the catalyst temperature is lower than the predetermined temperature $T_2$, and thus the oxidation of $SO_2$ is prevented while HC, CO and SOF are sufficiently purified. On the other hand, even when the catalyst temperature is higher than the predetermined temperature $T_2$, the increase of the rate of the oxidation reaction of $SO_2$ which is largely-increased in the range of the temperature higher than the predetermined temperature $T_2$ is largely prevented while the rate of the oxidation reaction of HC, CO and SOF is kept-relatively large. Therefore, even when the catalyst temperature is higher than the predetermined temperature $T_2$, the oxidation of $SO_2$ is prevented while HC, CO and SOF are sufficiently purified.

Therefore, according to the invention, the oxidation of $SO_2$ is prevented while HC, CO and SOF are sufficiently purified regardless of the catalyst temperature.

HC, CO and SOF may be discharged from the catalyst to the outside thereof without being purified in the metal-carrying layer when the times that HC, CO and SOF remain in the metal-carrying layer are short.

Therefore, the object of the exhaust purification catalyst according to the second embodiment is to increase the time that HC, CO and SOF remain in the metal-carrying layer.

Figure 7:
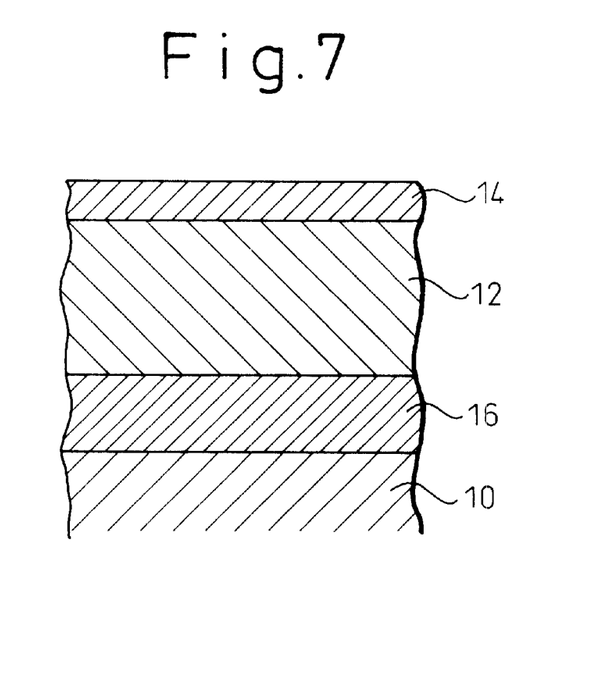
FIG. 7 is a cross-sectional view of the second embodiment of the exhaust purification catalyst.

FIG. 7 is a cross-sectional view of the exhaust purification catalyst according to the second embodiment. In the exhaust purification catalyst according to the second embodiment, a second diffusion restriction layer 16 for preventing HC, CO and SOF from diffusing is provided between the carrier substrate 10 and metal-carrying layer 12. The second diffusion restriction layer 16 is porous. The material of the second diffusion restriction layer 16 is selected from alumina, titania, silica and zirconia.

In the exhaust purification catalyst according to the second embodiment, the second diffusion restriction layer 16 slows HC, CO and SOF which passes through the metal-carrying layer 12 without being purified by the catalytic metal carried by the metal-carrying layer 12 in vicinity of the metal-carrying layer 12. Therefore, the chance that HC, CO and SOF are slowed in vicinity of the catalytic metal is increased so that the purification percentages of HC, CO and SOF are increased.

Alternatively, an adsorbing layer for adsorbing HC may be provided as the second diffusion restriction layer 16 between the carrier substrate 10 and the metal-carrying layer 12. The material of the adsorbing layer is zeolite comprised of, for example, alumina and silica. HC which passes through the metal-carrying layer without being purified by the catalytic metal is adsorbed on the adsorbing layer. Therefore, the chance of the staying of HC in vicinity of the metal-carrying layer 12 is further increased so that the purification percentage of HC is increased, compared with that in the catalyst with the second diffusion restriction layer. Further, the adsorbing layer is porous so that the diffusion of CO and SOF is prevented, and the purification percentages of CO and SOF are kept substantially equal to that in the catalyst with the-second diffusion restriction layer.

Alternatively, in order to prevent $SO_2$ from reaching the metal-carrying layer 12, the average radius of the pores of the diffusion restriction layer 14 provided in the outermost side relative to the carrier substrate may be smaller than that of the metal-carrying layer 12 to further increase the effect to prevent $SO_2$ from diffusing.

Alternatively, in order to prevent $SO_2$ from reaching the metal-carrying layer 12, a component which has a high affinity for $SO_2$ may be added to the diffusion restriction layer 14 provided in the outermost side relative to the carrier substrate to trap $SO_2$ in the diffusion restriction layer 14 to further increase the effect to prevent $SO_2$ from diffusing. The component which has a high affinity for $SO_2$ may be, for example, a transition metal such as Zr, or a rare earth element, or an alkaline metal, or an alkaline earth metal.

The layers of the exhaust purification catalyst are subject to the heat of the exhaust gas. In particular, the diffusion restriction layer of the exhaust purification catalyst according to the above embodiments are largely subject to the heat of the exhaust gas. Therefore, each layer of the exhaust purification catalyst, in particular, the diffusion restriction layer, is deteriorated by the heat of the exhaust gas.

Further, it is preferable to use titania which has relatively large poisoning resistance against sulfur as the material of the diffusion restriction layer, but titania has a problem that it is easily deteriorated by heat.

Therefore, the object of the exhaust purification catalyst according to the third embodiment is to prevent the heat deterioration of each layer of the exhaust purification catalyst, in particular, of the diffusion restriction layer.

Figure 8:
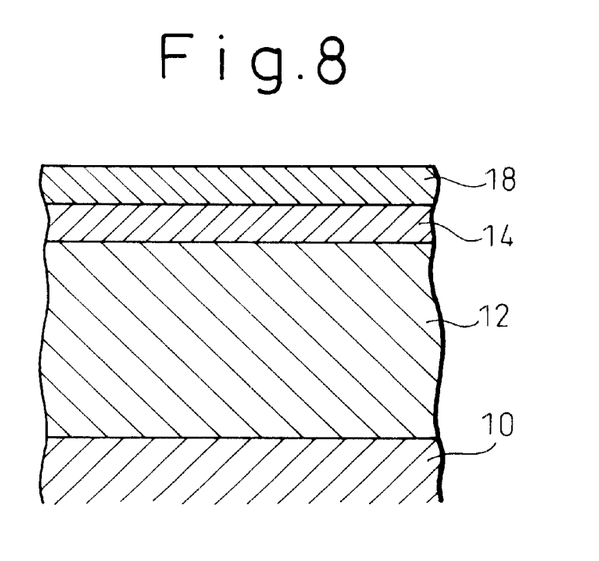
FIG. 8 is a cross-sectional view of the third embodiment of the exhaust purification catalyst.

FIG. 8 is a cross-sectional view of the exhaust purification catalyst according to the third embodiment. In the exhaust purification catalyst according to the third embodiment, in addition to the exhaust purification catalyst according to the first embodiment, a heat deterioration restriction layer 18 which has a predetermined thickness for preventing the diffusion restriction layer 14 from being deteriorated by the heat of the exhaust gas is provided on the surface of the diffusion restriction layer 14 which is located opposite to the metal-carrying layer 12. For example, the material of the heat deterioration restriction layer 18 can be alumina or zeolite which has large resistance against heat. The heat deterioration restriction layer 18 is porous. Therefore, the heat deterioration restriction layer 18 prevents $SO_2$ from reaching the metal-carrying layer. That is, according to the third embodiment, the diffusion restriction layer 14, and the heat deterioration restriction layer 18 serve as the diffusion restriction layer for preventing $SO_2$ from reaching the metal-carrying layer. In other words, a portion which has a predetermined thickness from the surface of the diffusion restriction layer opposite to the metal-carrying layer toward the interior of the diffusion restriction layer is the heat deterioration restriction layer 18, and the remaining portion is the diffusion restriction layer 14. The thickness of the diffusion restriction layer 14 added by the heat deterioration restriction layer 18 is smaller than about 170 $\mu$m to not prevent HC, CO and SOF from reaching the metal-carrying layer 12, preferably, several $\mu$m to several scores of $\mu$m.

HC is adsorbed on the heat deterioration restriction layer 18 if the material of the heat deterioration restriction layer 18 is zeolite which has a property to adsorb HC. Therefore, if the temperature of the exhaust purification catalyst does not reach a catalyst activating temperature, HC is adsorbed on the heat deterioration restriction layer 18 until the temperature of the exhaust purification catalyst reaches the catalyst activating temperature. Therefore, the purification percentage of HC in the exhaust purification catalyst is increased. Further, the droplets of the SOF vapors become gaseous after the SOF is adsorbed on the heat deterioration restriction layer 18. Gaseous SOF can easily be purified. Therefore, the purification percentage of SOF in the exhaust purification catalyst is increased.

Alternatively, a very small amount of the noble metals may be carried on the heat deterioration restriction layer 18. The noble metals oxidize HC, CO, SOF and $SO_2$. However, the rates of the oxidation reaction of HC, CO and SOF are larger than that of $SO_2$. Therefore, the production of the sulfide is prevented while the purification percentages of HC, CO and SOF are increased.

Therefore, according to the third embodiment, the deterioration of each layer of the exhaust purification catalyst by the heat of the exhaust gas is prevented. In particular, in the exhaust purification catalyst according to the third embodiment, the deterioration of the diffusion restriction layer by the heat of the exhaust gas is prevented.

The purification percentage of the exhaust purification catalyst is larger than a predetermined percentage when the catalyst temperature is higher than a predetermined temperature (the catalyst activating temperature). Therefore, in order to increase, the purification percentage of the exhaust purification catalyst, it is necessary to rapidly increase the catalyst temperature to the catalyst activating temperature and to keep the catalyst temperature higher than the catalyst activating temperature. If the exhaust purification catalyst is positioned closer to the engine, the catalyst temperature is rapidly increased to the catalyst activating temperature. However, if the heat resisting property of the exhaust purification catalyst is low, the exhaust purification catalyst is deteriorated by the heat of the exhaust gas. Further, the rate of the oxidation reaction of $SO_2$, is increased when the catalyst temperature of the exhaust purification catalyst is high, and thus there is a problem that a large amount of the toxic $SO_3$ is produced.

Therefore, the object of an-engine according to the first embodiment is to prevent the heat deterioration of the exhaust purification catalyst and the oxidation of $SO_2$, and to rapidly increase the catalyst temperature of the exhaust purification catalyst to the catalyst activating temperature.

Figure 9:
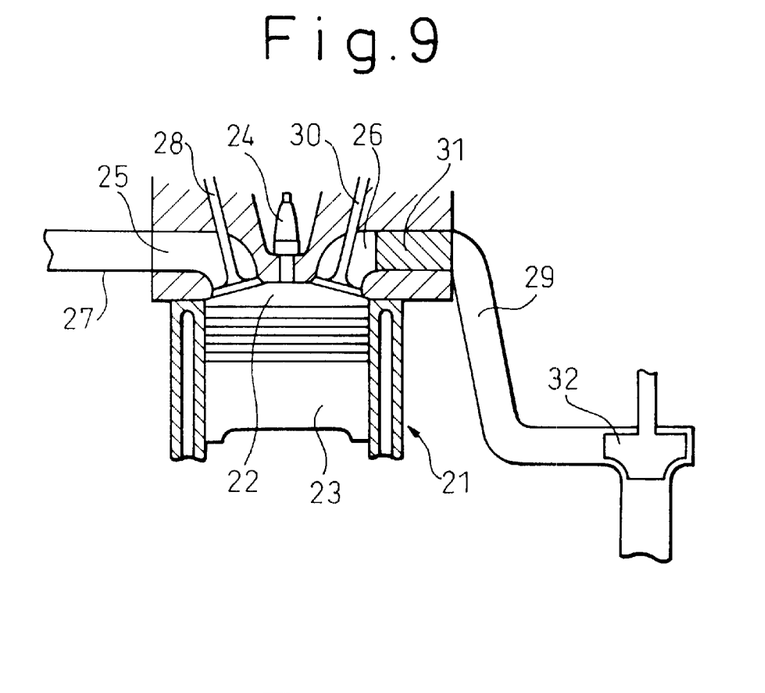
FIG. 9 is a cross-sectional view of the first embodiment of the engine comprising the exhaust purification catalyst according to the third embodiment.

FIG. 9 is a cross-sectional view of the engine according to the first embodiment. In FIG. 9, 21 denotes an engine body. Combustion chambers 22 are formed in the engine body 21. Piston 23 is positioned in each combustion chamber 22. Further, the engine body 21 comprises fuel injectors 24 for injecting fuel into the combustion chambers 22. Further, intake and exhaust ports 25 and 26 are formed in the engine body 21. An intake passage 27 is connected to the intake port 25. Further, intake valves 28 are positioned in the openings of the intake port 25 which opens to the combustion, chambers 22. On the other hand, an exhaust passage 29 is connected to the exhaust port 26. Further, exhaust valves 30 are positioned in the openings of the exhaust port 26 which opens to the combustion chambers 22.

Further, an exhaust purification catalyst 31 is positioned in the exhaust port 26 for purifying the exhaust gas. The exhaust purification catalyst is that according to the third embodiment.

The heat deterioration restriction layer 18 is provided in the exhaust purification catalyst 31 for preventing the heat deterioration of the diffusion restriction layer 14. Therefore, the exhaust purification catalyst 31 can be positioned in the exhaust port 25. Thus, the catalyst temperature of the exhaust purification catalyst 31 can rapidly be increased to the catalyst activating temperature. Further, the diffusion restriction layer 14 is provided in the exhaust purification catalyst 31 for preventing $SO_2$ from reaching the metal-carrying layer 12. Therefore, even if the catalyst temperature of the exhaust purification catalyst is increased, $SO_2$ is prevented from being oxidized in the metal-carrying layer 12, to produce sulfur oxide.

Therefore, in the engine according to the first embodiment, the heat deterioration of the exhaust purification catalyst and the oxidation of $SO_2$ are prevented while the catalyst temperature of the exhaust purification catalyst is rapidly increased to the catalyst activating temperature.

Further, the purification power of the exhaust purification catalyst is decreased if SOF adsorbs on the exhaust purification catalyst. However, in the engine according to the first embodiment, the catalyst temperature of the exhaust purification catalyst is kept high so that SOF is oxidized without being adsorbed on the exhaust purification catalyst. Therefore, in the engine according to the first embodiment, poisoning of the exhaust purification catalyst by SOF is prevented.

A exhaust turbine wheel 32 of a turbo charger is positioned in the exhaust passage 29. The exhaust turbine wheel 32 absorbs the heat energy so that the temperature of the exhaust gas downstream of the exhaust turbine wheel 32 is lower than that upstream of the exhaust turbine wheel 32. The temperature of the exhaust gas upstream of the exhaust turbine wheel 32 is high for the exhaust purification catalyst with no heat deterioration restriction layer so that the exhaust purification catalyst is deteriorated by the heat. Therefore, the exhaust purification catalyst with no diffusion restriction layer should be positioned downstream of the exhaust turbine wheel 32. However, the temperature of the exhaust gas downstream of the exhaust turbine wheel 32 is low so that the temperature of the exhaust purification catalyst is not increased to the catalyst activating temperature.

On the other hand, in the engine according to the first embodiment, the exhaust purification catalyst 31 can be positioned upstream of the exhaust turbine wheel 32. That is, the exhaust purification catalyst 31 can be positioned in the exhaust system between the combustion chamber 22 and the exhaust turbine wheel 32. Therefore, the temperature of the exhaust purification catalyst is increased to the catalyst activating temperature.

It should be noted that the words "upstream" and "downstream" are used along the flow of the exhaust gas, and the phrase "exhaust system" means the exhaust passage or the exhaust port.

Exhaust particulates such as SOF and soot are included in the exhaust gas discharged from the compression ignition engine. The size of the exhaust particulates becomes large when the exhaust particulates flow downwardly. That is, the size of the exhaust particulates is small at the upstream side. In the engine according to the above first embodiment, the exhaust purification catalyst 31 is positioned in the exhaust port 26 relatively close to the combustion chambers 22. Therefore, the size of the exhaust particulate in the exhaust gas which passes through the exhaust purification catalyst 31 is relatively small, so that there is a possibility that the exhaust purification catalyst 31 cannot trap the exhaust particulate to purify them. Therefore, the object of the exhaust purification catalyst according to the fourth embodiment is to purify the exhaust particulate even if the exhaust purification catalyst is positioned in the exhaust system close to the combustion chambers.

Figure 10:
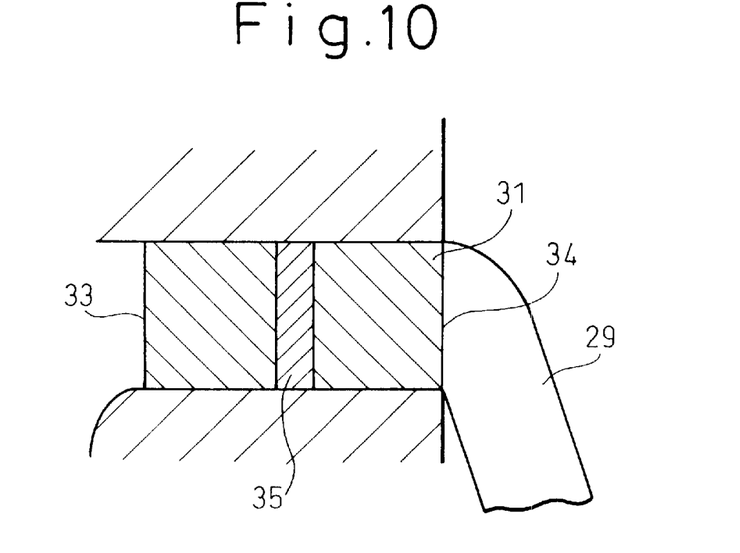
FIG. 10 is a cross-sectional view of the fourth embodiment of the exhaust purification catalyst.

FIG. 10 is a cross-sectional view of the exhaust purification catalyst according to the fourth embodiment. In the exhaust purification catalyst according to the fourth embodiment, a filter 35 for trapping the exhaust particulates is substantially positioned in the central portion of the exhaust purification catalyst 31 between inlet and outlet ends 33 and 34 of the exhaust o purification catalyst 31. The filter 35 is, for example, a foam filter or a metallic non-woven fabric.

The filter 35 can trap a relatively small exhaust particulate. The exhaust particulate trapped in the filter 35 is burned by the heat generated from the exhaust gas and by the purification reaction of the exhaust gas in the exhaust purification catalyst 31 upstream of the filter 35. Therefore, in the exhaust purification catalyst according to the fourth embodiment, the exhaust particulate can be purified even if the exhaust purification catalyst is positioned in the exhaust system close to the combustion chambers.

Further, $NO_2$ is produced in the exhaust purification catalyst when the exhaust gas is purified. $NO_2$ serves as a catalyst for promoting the burning of the soot. Therefore, $NO_2$ produced in the exhaust purification catalyst 31 upstream of the filter 35 flows into the filter 35 so that the soot in the exhaust particulates is easily burned. That is, the soot trapped in the filter 35 is early burned. Therefore, the increase of the flow resistance of the filter 35 is prevented, and the characteristics of discharging the exhaust gas is kept high even if the filter 35 is positioned in the exhaust purification catalyst 31.

Alternatively, the filter 35 may carry a catalytic metal for improving the characteristics of purifying the exhaust particulates.

What is claimed is:

1. An exhaust purification catalyst for a compression ignition engine comprising a carrier substrate, a porous metal-carrying layer which carries catalytic metal formed on the surface of said carrier substrate, and a porous diffusion restriction layer which has a thickness smaller than 170 μm and includes pores having sizes smaller than those of said metal-carrying layer provided on the surface of said metal-carrying layer opposite to said carrier substrate, and wherein a catalytic metal selected from the group consisting of alkali metals and alkaline earth metals which traps $SO_2$ and has an oxidation power lower than that of said catalytic metal carried on said metal-carrying layer, is carried on said diffusion restriction layer.

2. An exhaust purification catalyst for a compression ignition engine according to claim 1, wherein a diffusion restriction layer is provided between said carrier substrate and said metal carrying layer.

3. An exhaust purification catalyst for a compression ignition engine according to claim 1, wherein an adsorbing layer for adsorbing hydrocarbons is provided between said carrier substrate and said metal-carrying layer.

4. An exhaust purification catalyst for a compression ignition engine according to claim 1, wherein a portion of said diffusion restriction layer having a predetermined thickness extending from the surface of said diffusion restriction layer opposite to said metal-carrying layer into said diffusion restriction layer comprises a thermal deterioration restriction layer which has thermal resistance.

5. An exhaust purification catalyst for a compression ignition engine according to claim 4, wherein said thermal deterioration restriction layer is made of alumina, and the portion of the diffusion restriction layer that is not the thermal deterioration restriction layer is made of titania.

* * * * *

UNITED STATES PATENT AND TRADEMARK OFFICE
CERTIFICATE OF CORRECTION

PATENT NO. : 6,426,316 B2
DATED : July 30, 2002
INVENTOR(S) : Toshiaki Tanaka et al.

It is certified that error appears in the above-identified patent and that said Letters Patent is hereby corrected as shown below:

Title page,
Item [57], ABSTRACT,
Line 7, after "to the" insert -- carrier substrate. --

Column 1,
Line 11, change "ignition:)engine" to -- ignition engine --.
Line 40, change "substrates." to -- substrate. --.

Column 4,
Line 15, change "re action" to -- reaction --.

Signed and Sealed this

Twenty-eighth Day of January, 2003

JAMES E. ROGAN
*Director of the United States Patent and Trademark Office*